United States Patent
Kim et al.

(10) Patent No.: US 11,354,048 B2
(45) Date of Patent: Jun. 7, 2022

(54) STORAGE DEVICE AND DATA DISPOSAL METHOD THEREOF

(71) Applicant: SAMSUNG ELECTRONICS CO., LTD., Suwon-si (KR)

(72) Inventors: Juil Kim, Seoul (KR); Jaecheol An, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/036,587

(22) Filed: Sep. 29, 2020

(65) Prior Publication Data

US 2021/0318814 A1 Oct. 14, 2021

(30) Foreign Application Priority Data

Apr. 13, 2020 (KR) .................. 10-2020-0044554

(51) Int. Cl.
*G06F 3/06* (2006.01)

(52) U.S. Cl.
CPC .......... *G06F 3/0623* (2013.01); *G06F 3/0652* (2013.01); *G06F 3/0679* (2013.01)

(58) Field of Classification Search
CPC .... G06F 3/0623; G06F 3/0652; G06F 3/0679; G06F 2211/007; G06F 2211/008; G06F 21/70; G06F 21/72; G06F 21/75; G06F 2212/402

See application file for complete search history.

(56) References Cited

U.S. PATENT DOCUMENTS

| | | | |
|---|---|---|---|
| 8,812,875 B1 | 8/2014 | Melvin | |
| 9,195,858 B2* | 11/2015 | Trantham | H04L 9/0897 |
| 9,323,958 B2 | 4/2016 | Mostovych | |
| 2010/0037063 A1 | 2/2010 | Chontos et al. | |
| 2012/0039117 A1 | 2/2012 | Webb | |
| 2012/0093318 A1* | 4/2012 | Obukhov | G06F 21/79 |
| | | | 380/277 |

(Continued)

FOREIGN PATENT DOCUMENTS

| | | |
|---|---|---|
| JP | 6568461 B2 | 8/2019 |
| KR | 10-2019-0033930 A | 4/2019 |

(Continued)

OTHER PUBLICATIONS

McCune, J.M., Perrig, A., and M.K. Reiter, "Seeing-Is-Believing: Using Camera Phones for Human-Verifiable Authentication," Proceedings of the 2005 IEEE Symposium on Security and Privacy, 2005.*

(Continued)

*Primary Examiner* — Tracy A Warren
(74) *Attorney, Agent, or Firm* — Sughrue Mion, PLLC

(57) ABSTRACT

A storage device includes at least one non-volatile memory device, a memory controller encrypting data using key information, storing the encrypted data in the at least one non-volatile memory device, or reading the encrypted data from the at least one non-volatile memory device, decrypting the read encrypted data using the key information and outputting the decrypted data to an external device, and a security chip connected to the memory controller, and storing the key information, and including an identification module for use in a data disposal operation.

20 Claims, 11 Drawing Sheets

(56) References Cited

U.S. PATENT DOCUMENTS

| | | | | |
|---|---|---|---|---|
| 2016/0112386 A1* | 4/2016 | Park | ............... | H04W 12/04 |
| | | | | 713/171 |
| 2019/0018986 A1 | 1/2019 | Choi et al. | | |
| 2019/0033930 A1 | 1/2019 | Rupprecht | | |
| 2019/0332763 A1* | 10/2019 | Berler | ............... | H04L 9/3239 |
| 2020/0012824 A1 | 1/2020 | Kim | | |
| 2021/0149823 A1* | 5/2021 | Palmer | ............... | G06F 21/74 |

FOREIGN PATENT DOCUMENTS

| | | |
|---|---|---|
| KR | 10-2019-0045139 A | 5/2019 |
| KR | 10-2019-0089279 A | 7/2019 |
| KR | 10-2027543 B1 | 10/2019 |

OTHER PUBLICATIONS

EESemi, "Chip-on-Flex (COF)," Comprehensive Reference on Semiconductor Manufacturing, 2007, available: https://eesemi.com/cof.htm.*

AntennaTheory, "NFC Antenna," 2015, available: https://www.antenna-theory.com/definitions/nfc-antenna.php.*

* cited by examiner 132a 131a 134a 133a

STORAGE DEVICE AND DATA DISPOSAL METHOD THEREOF

CROSS-REFERENCE TO THE RELATED APPLICATION

This application is based on and claims benefit of priority from Korean Patent Application No. 10-2020-0044554 filed on Apr. 13, 2020 in the Korean Intellectual Property Office, the inventive concept of which is incorporated herein by reference in its entirety.

BACKGROUND

1. Field

The present inventive concept relates to a storage device, and a data disposal method thereof.

2. Description of the Related Art

In general, important data is stored on a storage device such as a hard disk drive (HDD) or a solid state drive (SSD) mounted in a computer, a laptop, a server, and the like. As such, when the computers, laptops, servers, and the like, are disposed of, internal data of storage devices mounted in the computers, laptops, servers, and the like must be completely removed and/or destroyed. In a related art method of physical shredding, data stored on such storage devices are completely removed. However, such physical shredding methods may be costly.

SUMMARY

An aspect of the present inventive concept may provide a storage device capable of the disposal of data at low cost, and a data disposal method thereof.

According to an aspect of the present inventive concept of the disclosure, there is provided a storage device comprising: at least one non-volatile memory device; a memory controller configured to: encrypt data using key information and store the encrypted data in the at least one non-volatile memory device, or read the encrypted data from the at least one non-volatile memory device, decrypt the read encrypted data using the key information as decrypted data and output the decrypted data to an external device; and a security chip connected to the memory controller, and configured to store the key information, wherein the security chip includes an identification module related to a data disposal operation.

According to another aspect of the present inventive concept of the disclosure, there is provided a storage device, comprising: at least one non-volatile memory device; a memory controller configured to control the at least one non-volatile memory device; and a security chip connected to the memory controller and configured to store key information corresponding to an encryption algorithm, wherein the memory controller comprises: at least one processor configured to control an overall operation of the memory controller; a buffer memory configured to temporarily store data required for the overall operation of the memory controller; an error correction circuit configured to generate a first error correction code of first data in a write operation, and correct at least one error of second data using a second error correction code in a read operation to produce error-corrected second data; a crypto module configured to generate the first data by encrypting data using the encryption algorithm in the write operation, and to decrypt the error-corrected second data using the encryption algorithm in the read operation; and a code memory configured to store code data for operating the memory controller; a host interface circuit configured to provide an interface with an external device; and a non-volatile memory interface circuit configured to provide an interface with the at least one non-volatile memory device, wherein, during the data disposal operation, the security chip is separated from the memory controller, and data disposal is confirmed through an authentication operation between the separated security chip and an external device.

According to another aspect of the present inventive concept of the disclosure, there is provided a data disposal method of a storage device including: at least one non-volatile memory device, a security chip storing key information, and a memory controller configured to use the key information to store encrypted data in the at least one non-volatile memory device, or decrypt the encrypted data read from the at least one non-volatile memory device, the data disposal method comprising: separating the security chip from the storage device; and performing an authentication operation between the separated security chip and an external verification device.

According to another aspect of the present inventive concept of the disclosure, there is provided a security device comprising: an elongated flexible substrate; a housing provided on the flexible substrate; a security core chip provided in the housing, and the security core chip configured to store key information corresponding to an encryption algorithm; a connector provide at one end of the flexible substrate, the connector configured to be electrically connected to the memory controller; and an identification module provided at another end of the flexible substrate, and the identification module configured to include information for confirmation a data disposal operation.

BRIEF DESCRIPTION OF DRAWINGS

The above and other aspects, features and other advantages of the present inventive concept will be more clearly understood from the following detailed description taken in conjunction with the accompanying drawings, in which.

DETAILED DESCRIPTION

Hereinafter, example embodiments in the present inventive concept will be described in detail with reference to the accompanying drawings.

In general, in a storage device and a data disposal method thereof, according to an example embodiment of the present inventive concept, a security chip (e.g., a secure element (SE)), which is difficult to duplicate and hack a key in the data disposal operation, may be used. For example, the data disposal operation for the storage device may include an operation of separating the security chip from the storage device. In particular, the security chip may be implemented in a form of an elongated rectangular package to easily destroy the data even if a user's hand so that the data disposal operation of the storage device is easily performed. In addition, the security chip may include an identification module such as a QR code or NFC to prove that the separated security chip is a disposed of storage device.

Figure 1:
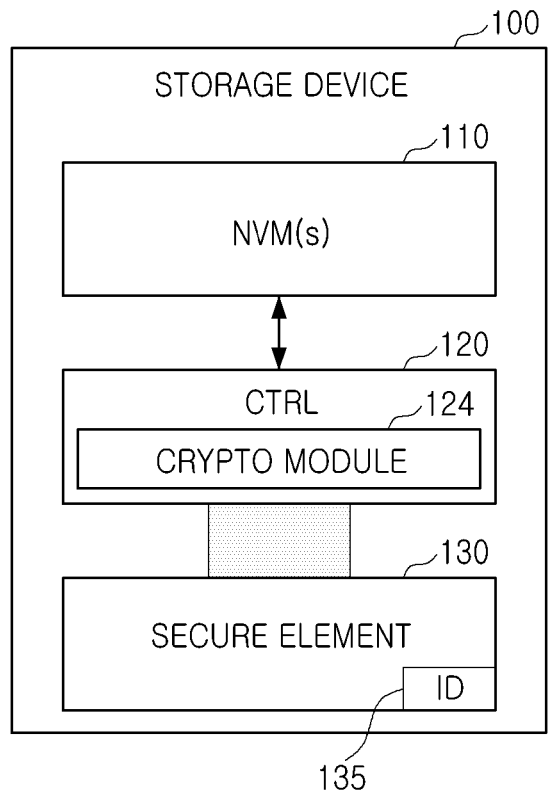
FIG. 1 is a view illustrating an example a storage device according to an example embodiment of the present inventive concept.

FIG. 1 is a view illustrating an example a storage device 100 according to an example embodiment of the present inventive concept. Referring to FIG. 1, the storage device 100 may include at least one non-volatile memory device 110, a memory controller (CTRL) 120, and security chips (security element) SE 130.

The storage device 100 may be implemented to store user data. For example, the storage device 100 may be a solid state drive (SSD), a memory card (CF, SD, microSD, etc.), a universal serial bus (USB) storage device, or the like.

According to an example embodiment, at least one non-volatile memory device 110 may be realized to store data. The non-volatile memory device 110 may include a NAND flash memory, a vertical NAND flash (VNAND) memory, a NOR flash memory, a resistive random access memory (RRAM), and a phase-change memory (PRAM), a magnetoresistive random access memory (MRAM), a ferroelectric random access memory (FRAM), a spin transfer torque random access memory (STTRAM), and the like. In addition, the non-volatile memory device 110 may be realized as a three-dimensional (3D) array structure.

In an example embodiment, the non-volatile memory device 110 may be realized to store encrypted data.

The memory controller 120 may be realized to control the non-volatile memory device 110 in response to a command or address from a host device. The memory controller 120 may transmit a command, an address, or a control signal to the non-volatile memory device 110, write data into the non-volatile memory device 110, or read data from the non-volatile memory device 110. For example, a command or an address provided from the host device may be a signal based on a communications protocol (e.g., a host interface) previously determined between the host device and the memory controller 120. In addition, a command, an address, and a control signal provided to the non-volatile memory device 110 may be a signal based on a communications protocol (e.g., a non-volatile interface) previously determined between the memory controller 120 and the non-volatile memory device 110.

In addition, the memory controller 120 may encrypt data received from the host device based on an encryption algorithm and write the encrypted data to the non-volatile memory device 110. In addition, the memory controller 120 may be realized to decrypt the encrypted data read from the non-volatile memory device 110 based on an encryption algorithm. Here, the encryption algorithm may be a symmetrical encryption algorithm or an asymmetrical encryption algorithm. In an example embodiment, the symmetrical encryption algorithm may be data encryption standard (DES), advanced encryption standard (AES) (AES-128, AES-192, AES-256, etc.), SEED, RC4, Twofish, Serpent, Blowfish, CASTS, 3DES, IDEA, and the like. In an example embodiment, the asymmetrical encryption algorithm may be Diffie-Hellman key exchange, DSS, ElGamal, ECC, RSA, or the like.

In an example embodiment, the memory controller 120 may include a crypto module 124 performing an encryption operation or a decryption operation based on an encryption algorithm. Here, the crypto module may be realized in hardware, software, or firmware.

The security chip 130 may be connected to the memory controller 120 and may be realized to store the encryption algorithm or store key information for performing the encryption algorithm. Here, the key information may include encryption key information or decryption key information. In an example embodiment, the security chip 130 may be connected to the memory controller 120 by a flexible printed circuit board (PCB). In an example embodiment, the security chip 130 may be realized to be simply extracted from the memory controller 120 by the user.

In addition, the security chip 130 may be implemented to include an identification module 135 having identification information (ID) to identify the data disposal of the storage device 100. In an example embodiment, the identification module 135 may include a barcode, a quick response (QR) code, a radio-frequency identification (RFID) chip, a near field communication (NFC) chip, or the like.

Although the security chip 130 illustrated in FIG. 1 is provided (or located) outside the memory controllers 120, the present inventive concept is not limited thereto. For instance, according to another example embodiment, the security chip of the present inventive concept may be embedded or provided in the memory controller 120.

In general, it is difficult to dispose data stored on the storage device during the disposal operation. Typically, storage devices have been physical shredded to dispose of the data. However, such physical shredding are expensive and/or require a long disposal time.

The storage device 100 according to an example embodiment of the present inventive concept may perform data disposal simply, by separating the security chip 130 having identification information ID for confirming the data disposal operation from the controller 120. If the storage device 100 encrypts and stores data using an encryption key in the security chip 130 and then destroys the security chip 130, it is difficult to decrypt the data stored in the storage device 100. This becomes a state in which the data in the storage device 100 is disposed of. In addition, even if the security chip 130 is destroyed by a third party, a disposal operation for the storage device 100 on which the security chip 130 was mounted using an identification (ID) module, linked with the security chip 130 may be confirmed.

Figure 2:
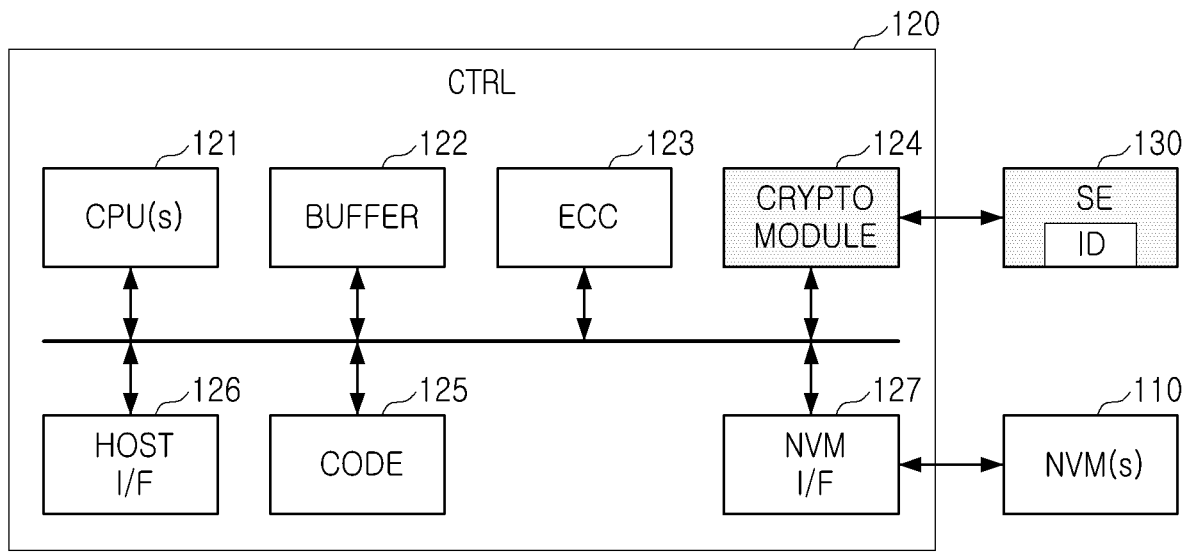
FIG. 2 is a view illustrating an example the memory controller illustrated in FIG. 1.

FIG. 2 is a view illustrating an example of the memory controller 120 illustrated in FIG. 1. Referring to FIG. 2, a memory controller 120 may include at least one processor (CPU(s)) 121, a buffer memory 122, an error correction circuit ECC 123, a crypto module 124, a code memory (CODE) 125, a host interface circuit (Host I/F) 126, and a non-volatile memory interface circuit (NVM I/F) 127.

The at least one processor 121 may be realized to control the overall operation of the storage device 100 (see FIG. 1). The processor 121 may include a central processing unit (CPU).

The buffer memory 122 may temporarily store data required for the operation of the memory controller 120. According to an example embodiment, the buffer memory 122 illustrated in FIG. 2 is disposed in the memory controller 120, however the present inventive concept is not limited thereto. According to an example embodiment of the present inventive concept, the buffer memory 122 may be disposed as a separate intellectual property (IP) outside the memory controller 120.

The error correction circuit (ECC) 123 may be realized to calculate an error correction code value of data to be written in the write operation, and error-correct the data read in the read operation based on an error correction code value. According to an example embodiment, the error correction circuit 123 may correct an error of data recovered from the non-volatile memory device 110 in a data recovery operation. The error correction circuit 123 may correct error using coded modulation such as a low density parity check (LDPC) code, a BCH code, a turbo code, a Reed-Solomon code, a convolution code, a recursive systematic code (RSC), and a trellis-coded modulation (TCM), a block coded modulation (BCM), and the like.

The crypto module 124 may be realized to encrypt data using an encryption algorithm or decrypt encrypted data using the encryption algorithm. As described in FIG. 1, the crypto module 124 may perform the encryption algorithm using key information stored on the security chip 130.

The code memory 125 may be implemented to store code data necessary to operate the memory controller 120. Here, the code memory may be implemented as a non-volatile memory device.

A host interface circuit 126 may be implemented to provide an interface function with an external device. The host interface circuit 126 may be implemented as non-volatile memory express (NVMe), peripheral component interconnect express (PCIe), serial at attachment (SATA), small computer system interface (SCSI), serial attached SCSI (SAS), universal storage bus ((USB) attached SCSI (UAS)), internet small computer system interface (iSCSI), or fiber channel, fiber Channel over ethernet (FCoE).

A non-volatile memory interface circuit 127 may be implemented to provide an interface function with the non-volatile memory device 110. Meanwhile, the security chip 130 and the memory controller 120 illustrated in FIG. 2 may be implemented in an extraction type.

In an example embodiment, in the data disposal operation, the security chip 130 may be separated from the memory controller 120. The data disposal may be confirmed through an authentication operation between the separated security chip 130 and an external device.

According to an example embodiment, the security chip 130 illustrated in FIG. 2 is provided outside the memory controller 120. However, the present inventive concept need not be limited thereto. According to another example embodiment, the security chip 130 of the present inventive concept may be embedded or provided in the memory controller 120.

Meanwhile, the security chip 130 according to an example embodiment of the present inventive concept may be implemented as a package shape of a thin and elongated rectangular shape so as to be easily separated from the storage device 100.

Figure 3A:
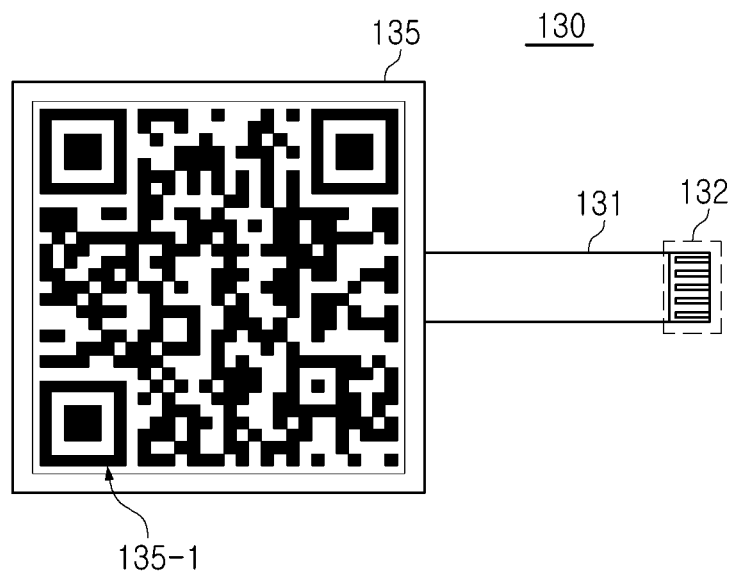
FIGS. 3A and 3B are views illustrating an example a security chip according to an example embodiment of the present inventive concept.
Figure 3B:
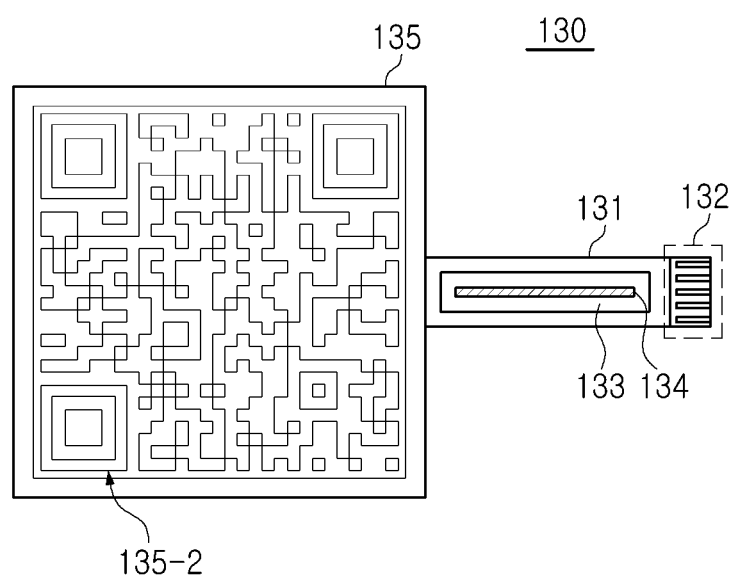

FIGS. 3A and 3B are views illustrating an example a security chip 130 according to an example embodiment of the present inventive concept. Referring to FIG. 3A, the security chip 130 may be connected to the memory controller 120 (see. FIG. 1) through a flexible substrate 131. A connector 132 to be electrically connected to the memory controller 120 may be provided at one end of the flexible substrate 131. In addition, a bar code 135 for identification of disposal may be connected to the other end of the flexible substrate 131. Meanwhile, the barcode 135 illustrated in FIG. 3A may include an upper surface 135-1 of the barcode 135 showing an identification code.

Referring to FIG. 3B, FIG. 3B is a view illustrating an example an example in which the security chip 130 illustrated in FIG. 3B is inverted. Referring to FIG. 3B, the flexible substrate 135 may include a package 133 packaging a core chip 134 of the security chip 130. As illustrated in FIG. 3B, the security chip 130 may be implemented to be easily broken by a user, by implementing the package 133 in a thin and elongated shape. For example, the security chip 130 may include at least one groove or irregularity to allow the security chip 130 to be easily broken near a broken line, as shown in FIG. 3B.

Meanwhile, the barcode 135 shown in FIG. 3B may include a lower surface 135-2 of the barcode 135 where the identification code is invisible or visible well.

Meanwhile, a core of the security chip 130 shown in FIGS. 3A and 3B is implemented in a form connected to the barcode 135. However, the present inventive concept need not be limited thereto.

Figure 4A:
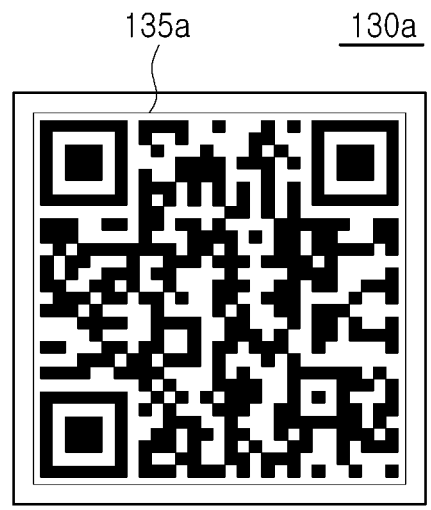
FIGS. 4A and 4B are views illustrating an example a security chip according to another example embodiment of the present inventive concept.
Figure 4B:
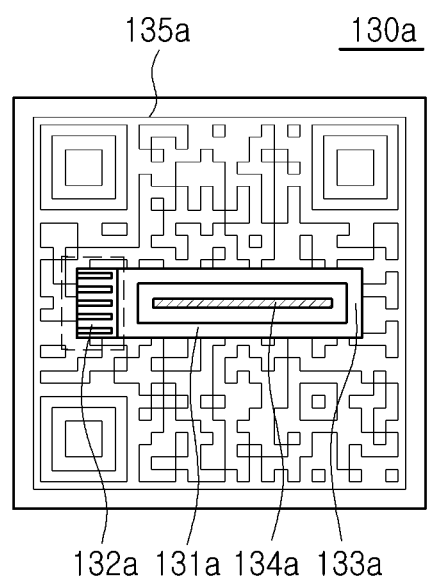

FIGS. 4A and 4B are views illustrating an example a security chip 130a according to another example embodiment of the present inventive concept. Referring to 4A, an internal configuration of the security chip 130a may be covered with the barcode 135a. Referring to FIG. 4B, the security chip 130a may have a form in which the security chip 130 is inverted, illustrated in FIG. 4A. In an example embodiment, the flexible substrate 131a may be formed in a central portion of the barcode 135a. A connector 132a to be electrically connected to the memory controller 120 may be connected to one end of the flexible substrate 131a. The flexible substrate 131a may include a package 134a packaging the core chip 133a of the security chip 130. Meanwhile, as illustrated in FIG. 4B, the security chip 130a may be implemented to be easily broken by a user.

Meanwhile, according to another example embodiment of the present inventive concept, the security chip 130 may implement identification information (ID) with an NFC chip.

Figure 5:
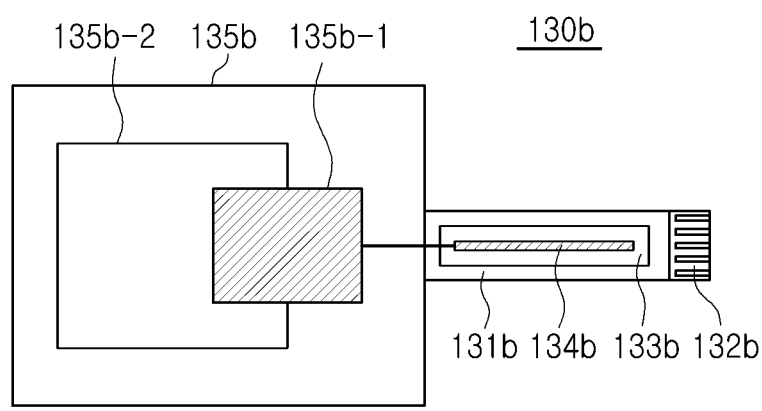
FIG. 5 is a view illustrating an example a security chip according to another example embodiment of the present inventive concept.

FIG. 5 is a view illustrating an example of a security chip 130b according to another example embodiment of the present inventive concept. Referring to FIG. 5, the security chip 130b may include a flexible substrate 131b, a connector 132*b*, a package 133*b*, a first security core chip 134*b*, and a NFC chip 135*b*. The first security core chip 134*b* may perform mutual authentication with the memory controller 120 (see FIG. 1).

In an example embodiment, a connector 132*b* connected to the memory controller 120 (see FIG. 1) may be disposed at one end of the flexible substrate 131*b*, and an NFC chip 135*b* may be disposed at the other end of the flexible substrate 131*b*.

In addition, the NFC chip 135*b* may be implemented to perform wireless communication or receive wireless power from an external wireless device. In addition, the NFC chip 135*b* may be implemented to automatically or manually perform an authentication operation with the first security core chip 133*b*.

The NFC chip 135*b* may include a second security core chip 135*b*-1 and an NFC antenna 135*b*-2. The second security core chip 135*b*-1 may be implemented to perform mutual authentication with the first security core chip 134*b*. In addition, the second security core chip 135*b*-1 may perform mutual authentication with an external wireless device.

The NFC antenna 135*b*-2 may be implemented to receive a wireless signal or wireless power from an external wireless device. The NFC antenna 135*b*-2 may be implemented to transmit the received wireless signal or wireless power to the second security core chip 134*b*.

According to an example embodiment, the NFC chip 135*b* having a security chip 135*b*-1 embedded therein may be used to prevent counterfeiting in proof of disposal due to duplication. Hereinafter, in the case of the NFC chip having a security chip 135*b*-1 embedded therein, the data disposal process will be described. For convenience of description, the first core chip 134*b* of the security chip 130*b* for data disposal will be defined as SE1, and the second core chip 134*b* embedded in the NFC chip 135*b* will be defined as SE2.

When a user first uses the storage device 100, a case of separating and counterfeiting SE2 and SE1 through authentication of SE2 and SE1 in the NFC chip 135*b* can be prevented. After the data is disposed of, SE1 does not operate, such that authentication information that SE2 and SE1 have been authenticated may be stored in SE2. The SE2 of the NFC chip 135*b* may perform authentication, so that duplication of the NFC chip 135*b* having the SE2 embedded therein may be prevented. Authentication may be performed including authentication information indicating that the SE2 and SE1 have been authenticated at the same time. Identification information, such as a serial number of the storage device 100, may be stored in a smartphone using NFC communication with the smartphone. Thereafter, when the storage device 100 is used, when data is encrypted using the SE1, a case in which SE2 and SE1 are separated and used through periodic mutual authentication with SE2 can be prevented. After the storage device 100 is disposed of, when the user receives the destroyed SE1 and the modularized SE2 received from the disposal company, authentication of the SE2 and the NFC chip 135*b* and the smartphone may be performed. Authentication may be performed including information that SE2 and SE1 have been authenticated at the same time. It may confirm that the user's storage device 100 has been destroyed by reading the serial number of the storage device 100 with a smartphone using communication with the embedded NFC chip 135*b*.

Meanwhile, a data disposal process of the storage device 100 according to an example embodiment of the present inventive concept will be described below.

Figure 6:
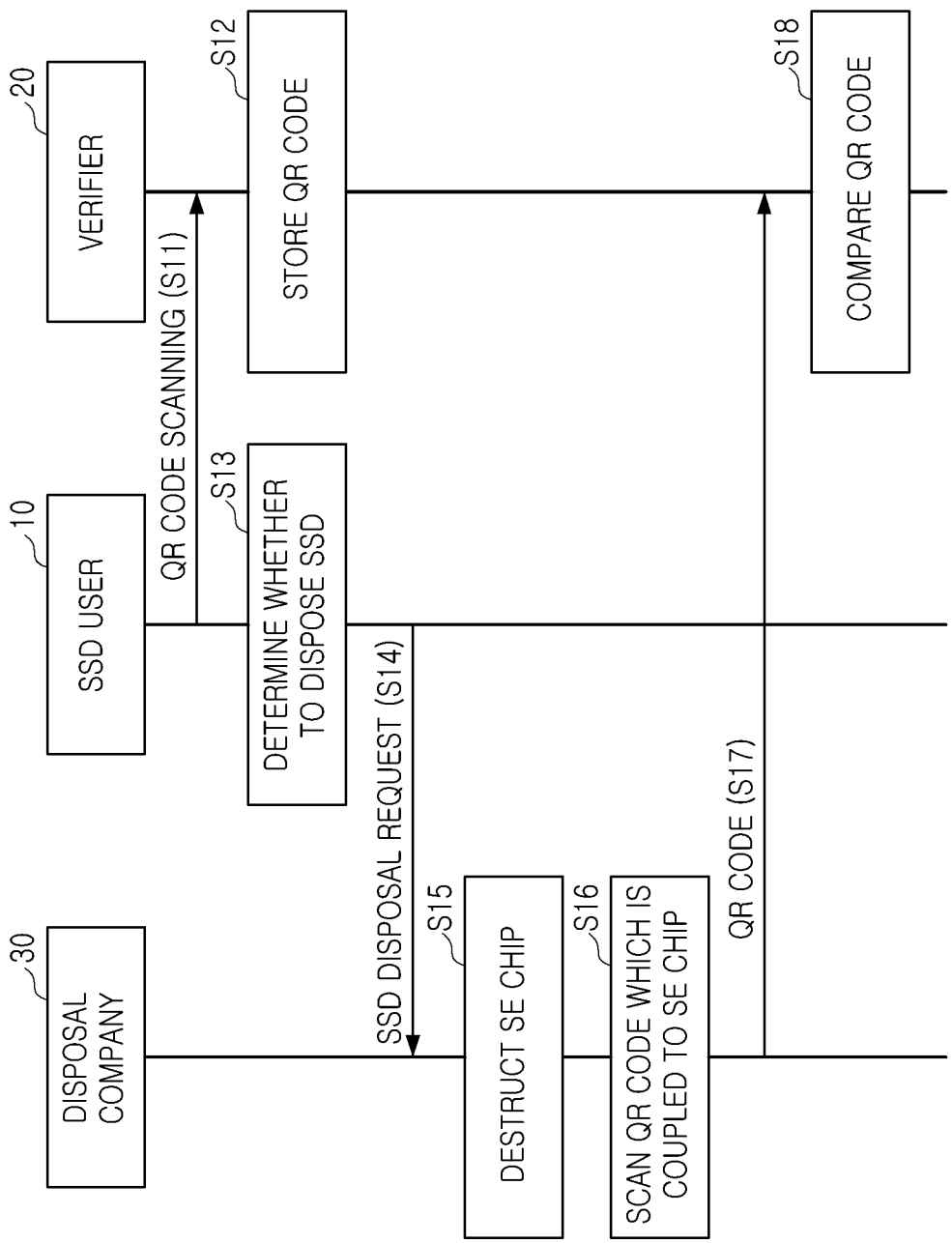
FIG. 6 is a ladder diagram illustrating an example a process of the disposal of data of the storage device according to an example embodiment of the present inventive concept.

FIG. 6 is a ladder diagram illustrating an example a data disposal process of the storage device 100 according to an example embodiment of the present inventive concept. First, a user 10 of the storage device (SSD) 100 may store a QR code of the storage device 100 in a verifier 20. Here, the user 10 may be a data center, a government agency, or an individual, and the verifier 20 may be a user's mobile device (for example, a mobile phone or a smart phone). The verifier 20 may recognize the QR code of the storage device 100 using a verification application activating a scanner (S11). The verifier 20 may store the QR code of the recognized storage device 100 (S12).

Thereafter, the user 10 may determine disposal of the storage device 100 according to an internal policy or a predetermined method (S13). The user 10 may request the disposal of the storage device 100 to a disposal company 30 (S14).

The disposal company 30 may recognize (scan) the QR code connected to the destroyed security chip (S16). The disposal company 30 may transmit the QR code recognized as the destroyed security chip to the verifier 20 using a wired or wireless communication method.

Thereafter, the verifier 20 may complete a data disposal process of the storage device 100, by comparing the QR code received from the disposal company 30 with the stored QR code (S18).

The data disposal process of the storage device 100 according to an example embodiment of the present inventive concept may be performed simply and inexpensively, by verifying the QR code of the security chip.

Meanwhile, the storage device 100 according to an example embodiment of the present inventive concept may use a security chip 130, in which, it is difficult to compromise the keys used for encryption and decryption. For instance, the keys used for encryption and decryption that are stored in the security chip 130 may not be altered or duplicated. The storage device 100 may perform authentication between the security chip 130 and the memory controller 120 using the keys, such that the data of the storage device 100 can be read or written only when the authenticated security chip 130 is mounted. Accordingly, the use of the security chip 130 makes it difficult for an unauthorized user to steal data inside the storage device 100.

Figure 7:
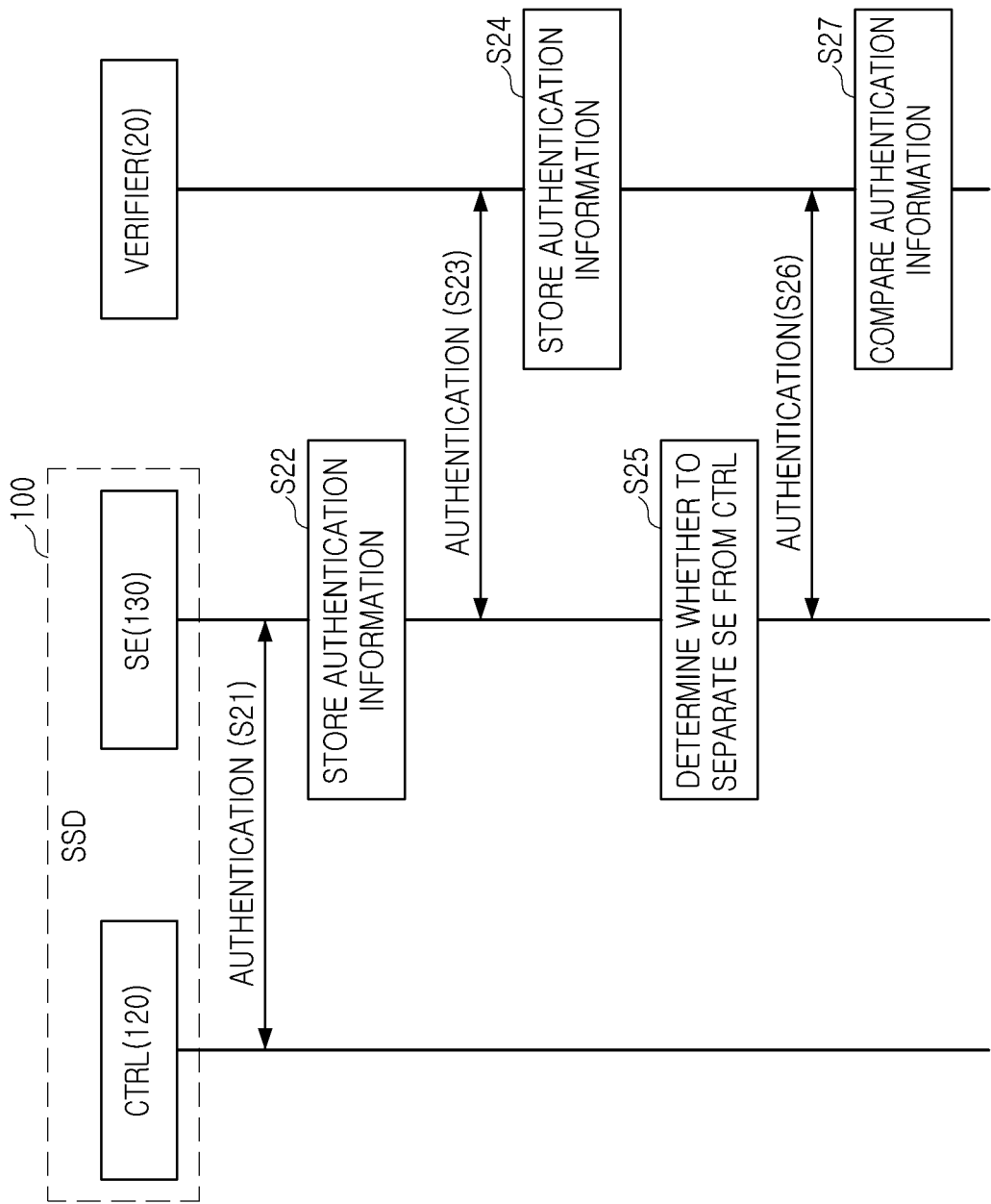
FIG. 7 is a ladder diagram illustrating an example an authentication process used to prove disposal of data of the storage device according to an example embodiment of the present inventive concept.

FIG. 7 is a ladder diagram illustrating an example an authentication process used to confirm data disposal of the storage device 100 according to an example embodiment of the present inventive concept. Referring to FIG. 7, first, a first authentication operation may be performed between the memory controller 120 and the security chip 130 of the storage device 100 (S21). Here, the first authentication operation may be performed by a challenge-response authentication method. However, it should be understood that the first authentication operation of the present inventive concept is not limited thereto. In an example embodiment, the security chip 130 may periodically or non-periodically perform an authentication operation with the memory controller 120.

After the first authentication operation is completed, the security chip 130 may store first authentication information corresponding to the first authentication operation (S22). Here, the first authentication information may include information related to the storage device 100, an authentication time, or an authentication expiration time. Meanwhile, it should be understood that the first authentication information of the present inventive concept is not limited thereto.

Thereafter, the security chip 130 may perform a second authentication operation with a verifier 20 through a wireless method (S23). Here, the second authentication operation may be performed using a challenge-response authentication method. However, it should be understood that the second authentication operation of the present inventive concept is not limited thereto.

After the second authentication operation is completed, the verifier 20 may store second authentication information corresponding to the second authentication operation (S24). Here, the second authentication information may include first authentication information, information related to the security chip 130, an authentication time, or an authentication expiration time. Meanwhile, it should be understood that the second authentication information of the present inventive concept is not limited thereto. In an example embodiment, the security chip 130 may store second authentication information.

Thereafter, a data disposal operation for the storage device (SSD) 100 may be determined. When the data disposal operation is performed, it may be determined whether the security chip 130 is separated from the memory controller 120 (S25). In an example embodiment, a separation determination operation of the security chip 130 may be performed by the security chip 130 itself. In another example embodiment, the separation determination operation of the security chip 130 may be performed by a user's naked eye.

Thereafter, the verifier 20 may perform a third authentication operation with the security chip 130 separated from the memory controller 120 using a wireless communication method (S26). Here, the third authentication operation may be performed by a challenge-response authentication method. However, it should be understood that the third authentication operation of the present inventive concept is not limited thereto.

After the third authentication operation is completed, the verifier 20 may verify destruction of the security chip 130 by using the third authentication information corresponding to the third authentication operation and the stored second authentication information. Here, the third authentication information may include first authentication information, second authentication information, information related to the security chip 130, an authentication time, or an authentication expiration time. Meanwhile, it should be understood that the third authentication information of the present inventive concept is not limited thereto.

In the data disposal operation of the storage device 100 according to an example embodiment of the present inventive concept, it may be confirmed that the storage device 100 that was in use has been disposed of even if the storage device 100 is disposed of by a third party, by comparing identification information such as a serial number read using a QR code or an NFC chip as a verifier 20, such as a smartphone, or the like, with a state after the data is disposed of. Meanwhile, the storage device 100 according to an example embodiment of the present inventive concept may periodically or non-periodically perform an authentication operation between the security chip of the NFC chip and the verifier 20 to confirm data disposal of the storage device 100.

Figure 8:
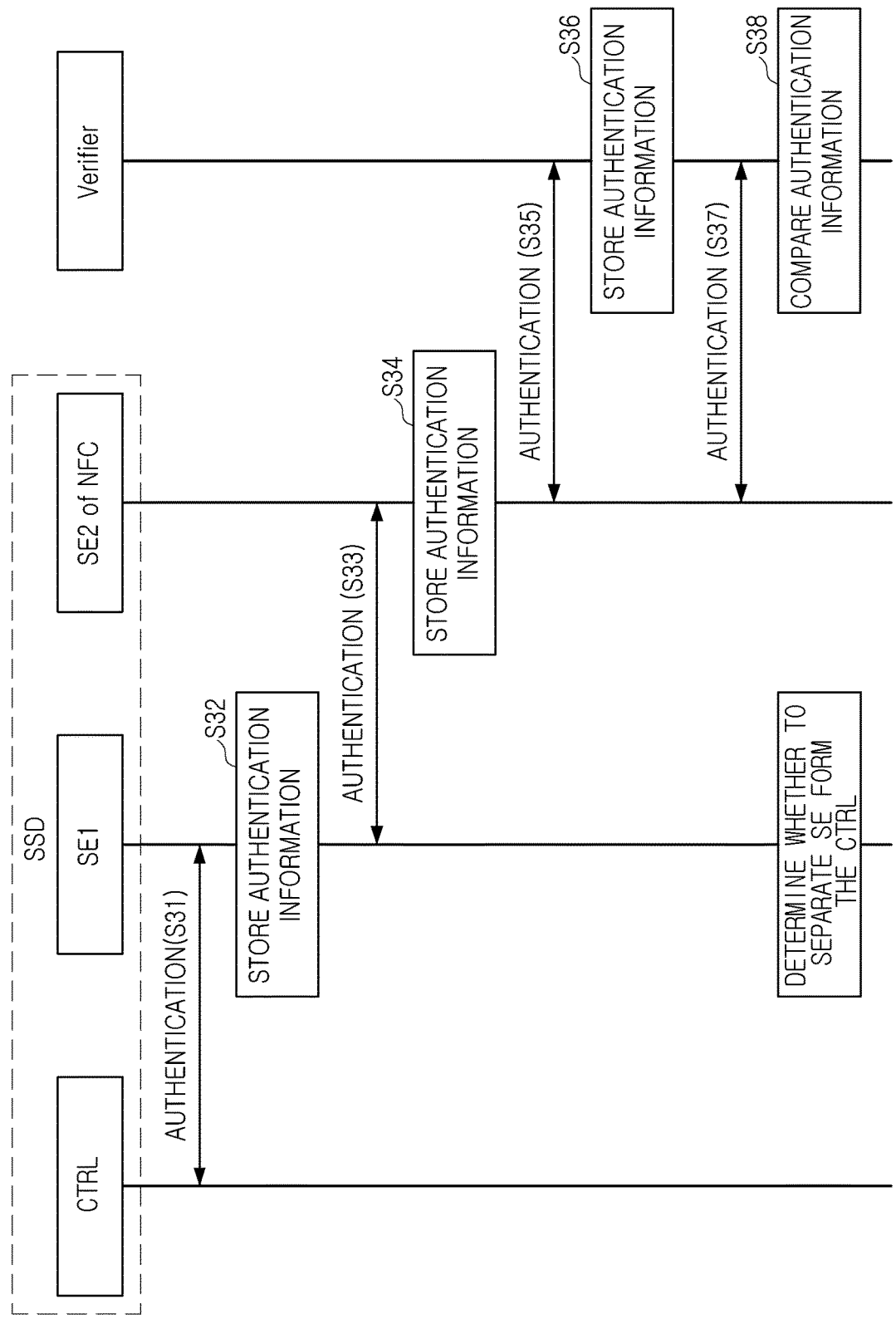
FIG. 8 is a ladder diagram illustrating an example an authentication process used to prove disposal of data of the storage device according to another example embodiment of the present inventive concept.

FIG. 8 is a ladder diagram illustrating an example of an authentication process used to confirm data disposal of the storage device 100 according to another example embodiment of the present inventive concept. Referring to FIG. 8, a first authentication operation may be performed between the memory controller 120 (see FIG. 1) of the storage device 100 (see FIG. 1) and the security chip 130*b* (see FIG. 5) (S31).

After the first authentication operation is completed, a first core chip (SE1) 134*b* of a security chip 130*b* (see FIG. 5) may store first authentication information corresponding to a first authentication operation (S32).

Thereafter, the first core chip 134*b* of the security chip 130*b* may perform a second authentication operation with a second core chip 135*b*-1 of the NFC chip 135*b* (S33). Here, the second authentication operation may be performed using a challenge-response authentication method. However, it should be understood that the second authentication operation of the present inventive concept is not limited thereto.

After the second authentication operation is completed, the second core chip 135*b*-1 of the NFC chip 135*b* may store second authentication information corresponding to the second authentication operation (S34). Here, the second authentication information may include first authentication information, information related to the first core chip 134*b* of the security chip 130*b*, an authentication time, or an authentication expiration time. Meanwhile, it should be understood that the second authentication information of the present inventive concept is not limited thereto. In an example embodiment, the first core chip 134*b* of the security chip 130*b* may store second authentication information.

Thereafter, the second core chips SE2 and 135*b*-1 of the NFC chip 135*b* may perform a third authentication operation with the verifier 20 through a wireless method (S35). After the third authentication operation is completed, the verifier 20 may store third authentication information corresponding to the third authentication operation (S36). Here, the third authentication information may include second authentication information, information related to the security chip 130*b*, an authentication time, or an authentication expiration time.

Thereafter, a data disposal operation for the storage device (SSD) 100 may be determined. During the data disposal operation, it may be determined whether the security chip 130 is separated from the memory controller 120. Thereafter, the verifier 20 may perform a fourth authentication operation with the NFC chip 135*b* of the security chip 130*b* separated from the memory controller 120 using a wireless communication method (S37). Specifically, the fourth authentication operation may be performed by the NFC communication method between the second core chips SE2 and 135*b*-1 of the NFC chip 135*b* and the verifier 20.

After the fourth authentication operation is completed, the verifier 20 may verify destruction of the security chip 130*b* using the fourth authentication information corresponding to the fourth authentication operation and the stored third authentication information. Thus, the data disposal operation of the storage device 100 may be completed.

As described above, the storage device 100 may store data by encrypting it using a key stored in the security chip 100. Therefore, when the security chip storing the key is disposed of (or destroyed), the data stored in the storage device 100 cannot be not decrypted since the key information is no longer available. Accordingly, the data and the storage device 100 have been logically disposed of (or destroyed). For instance, the data stored in the storage device 100 may be logically disposed of (or destroyed) with the need for physically shredding the storage device 100.

Figure 9:
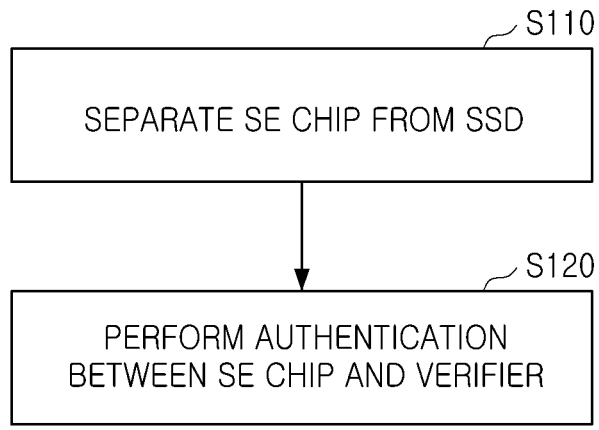
FIG. 9 is a view illustrating an example a data disposal method of the storage device according to an example embodiment of the present inventive concept.

FIG. 9 is a diagram exemplarily showing a method of the disposal of data in the storage device 100 according to an example embodiment of the present inventive concept. Referring to FIGS. 1 to 9, a method of the disposal of data in the storage data 100 may proceed as follows.

In operation S110, based on a determination to dispose of the storage device 100, a user or a disposal company may separate the security chip 100 (see FIG. 1) from the storage device 100 (see FIG. 1). In an example embodiment, the security chip 130 may be made of a thin and elongated rectangular shaped chip to be easily broken, even by hand, during a data disposal operation.

Thereafter, an authentication operation may be performed between the separated security chip 130 for the verification of disposal and the verifier 20 (see FIG. 6) (S120). Here, the verifier 20 may store authentication information corresponding to the security chip 130 in advance. The verifier 20 may perform authentication using stored authentication information and identification information that is scanned or read during the disposal operation.

For example, the user may scan a QR code with a smart phone when first using the storage device 100, and store identification information such as a serial number of the storage device 100 in own smart phone. After the disposal of the storage device, the user may confirm whether the QR code connected to the destroyed security chip received from the disposal company and the serial number stored in own smart phone are the same, such that it may be proved that the user's storage device 100 has been disposed of.

Meanwhile, the wireless device according to an example embodiment of the present inventive concept may simultaneously perform data disposal operations for a plurality of storage devices through a wireless communication method.

Figure 10:
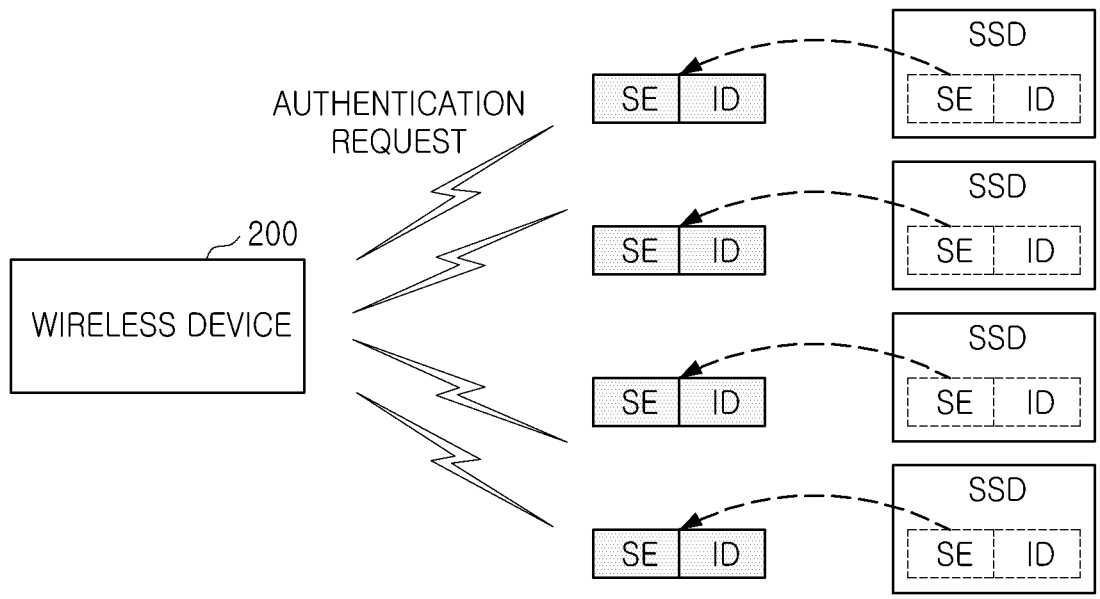
FIG. 10 is a view illustrating an example a data disposal operation for a plurality of storage devices according to an example embodiment of the present inventive concept.

FIG. 10 is a view illustrating an example a data disposal operation for a plurality of storage devices according to an example embodiment of the present inventive concept. Referring to FIG. 10, a wireless device 200 (see FIG. 1) may transmit an authentication request to a plurality of storage devices (SSDs) in a broadcast manner. Each of the plurality of storage devices may include the security chip SE described with reference to FIGS. 1 to 9. A security chip SE may receive an authentication request from the wireless device 200 and initiate an authentication operation corresponding to a data disposal operation. In addition, the security chip SE may transmit a completion signal to a wireless device 200 after the authentication operation is performed. In an example embodiment, the completion signal may include identification information ID corresponding to each storage device SSD. In an example embodiment, the wireless device 200 may receive identification information ID corresponding to the security chip SE and prove disposal for the corresponding storage device.

In an embodiment, the wireless device may be a mobile device. For example, the wireless device may perform a data disposal operation for the storage device (SSD) by a deletion application installed on the mobile device.

Meanwhile, an authentication request method of the present inventive concept will not be limited to the broadcast manner. The authentication request method according to an example embodiment of the present inventive concept may be transmitted by a unicast manner or a multicast manner.

Meanwhile, in the data disposal operation of the storage device according to an example embodiment of the present inventive concept, after internal data of the non-volatile memory device is primarily deleted, the security chip may be secondarily separated.

Meanwhile, the data disposal method according to an example embodiment of the present inventive concept is applicable to a mobile device.

Meanwhile, an authentication request method of the present inventive concept will not be limited to using a wireless communication. The authentication request method according to an example embodiment of the present inventive concept may be transmitted using a wired communication.

Figure 11:
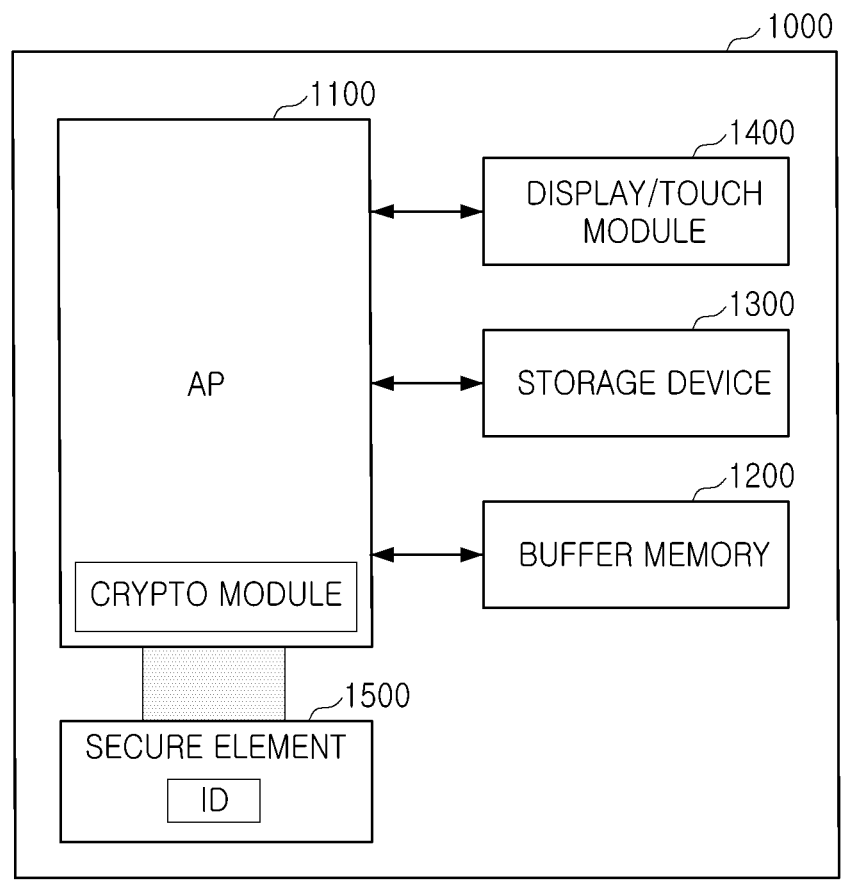
FIG. 11 is a diagram illustrating an example a mobile device according to an example embodiment of the present inventive concept.

FIG. 11 is a view illustrating an example a mobile device 1000 according to an example embodiment of the present inventive concept. Referring to FIG. 11, a mobile device 1000 may include an application processor AP 1100, at least one buffer memory 1200, at least one storage device 1300, a display/touch module 1400, and a security chip 1500. For example, the mobile device 1000 may be implemented as a laptop computer, a mobile phone, a smartphone, a tablet personal computer (PC), or a wearable computer.

The application processor (AP) 1100 may be realized to control an overall operation of the mobile device 1000. The application processor 1100 may execute applications that provide Internet browsers, games, videos, and the like. In an example embodiment, the application processor 1100 may include a single core or multiple cores. In an example embodiment, the application processor 1100 may further include a cache memory located inside or outside. In addition, the application processor 1100 may optionally include a controller, a neural processing unit (NPU), and the like.

In an example embodiment, the application processor 1100 may be realized as a system-on-chip (SoC). A kernel of an operating system run on the system on a chip (SoC) may include an input/output scheduler and a device driver for controlling the storage device 1300. The device driver may control access performance of the storage device 1300 by referring to the number of synchronous queues managed by the input/output scheduler, or control the CPU mode, DVFS level, and the like in the SoC.

The buffer memory 1200 may be realized to store data necessary for the operation of the application processor 1100. For example, the buffer memory 1200 may temporarily store an operating system (OS) and application data or may be used as an execution space of various software codes. In addition, the buffer memory 1200 may store data related to artificial intelligence operations. In an example embodiment, the buffer memory 1200 may be realized as a DRAM or a PRAM.

The storage device 1300 may be realized to store user data. The storage device 1300 may be included in the mobile device 1000 in an embedded form. In another example embodiment, the storage device 1300 may be included in the mobile device 1000 in a detachable manner. In an example embodiment, the user data may be data encrypted based on an encryption algorithm. Here, the key information required for the encryption algorithm is stored in the security chip 1500.

The storage device 1300 may store data collected from at least one sensor or store data network data, augmented reality (AR)/virtual reality (VR) data, and high definition (HD) content. The storage device 1300 may include a solid state driver (SSD), an embedded multimedia card (eMMC), and the like.

The display/touch module 1400 may be realized to output data or input through a touch. For example, the display/touch module 1400 may output image data sensed using at least one sensor or output calculated data using the application processor 1100. In addition, the display/touch module 1400 may recognize a user's touch.

The security chip 1500 may perform or process a general security operation of the mobile device 1000. The security chip 1500 may store important information necessary to perform the security operation. For example, the security chip 1500 may store key information necessary to operate the encryption algorithm. In addition, the security chip 1500 may include identification information (ID) for identifying the mobile device 1000. The security chip 1500 may prove the data disposal of the mobile device 1000 through authentication with an external wireless device, as described with reference to FIGS. 1 to 10.

According to an example embodiment, the present inventive concept may be applicable to a computing system.

Figure 12:
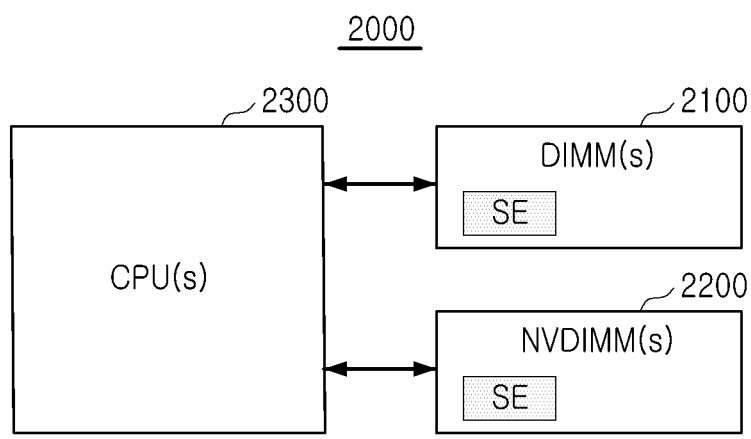
FIG. 12 is a block diagram illustrating an example a computing system according to an example embodiment of the present inventive concept.

FIG. 12 is a block diagram illustrating an example a computing system 2000 according to an example embodiment of the present inventive concept. Referring to FIG. 12, the computing system 2000 may include at least one memory module (DIMM) 2100, at least one non-volatile memory module (NVDIMM) 2200, and at least one processor 2300. Here, each of the at least one memory module 2100 and the at least one non-volatile memory module 1200 may embed a security chip SE having identification information ID used in the above-described data disposal operation.

Meanwhile, the present inventive concept is applicable to various types of computing systems (e.g., a central processing unit (CPU)/graphic processing unit (GPU)/neural processing unit (NPU) platform).

According to an example embodiment, the present inventive concept may be applicable to an electric system safe from hacking threats.

Figure 13:
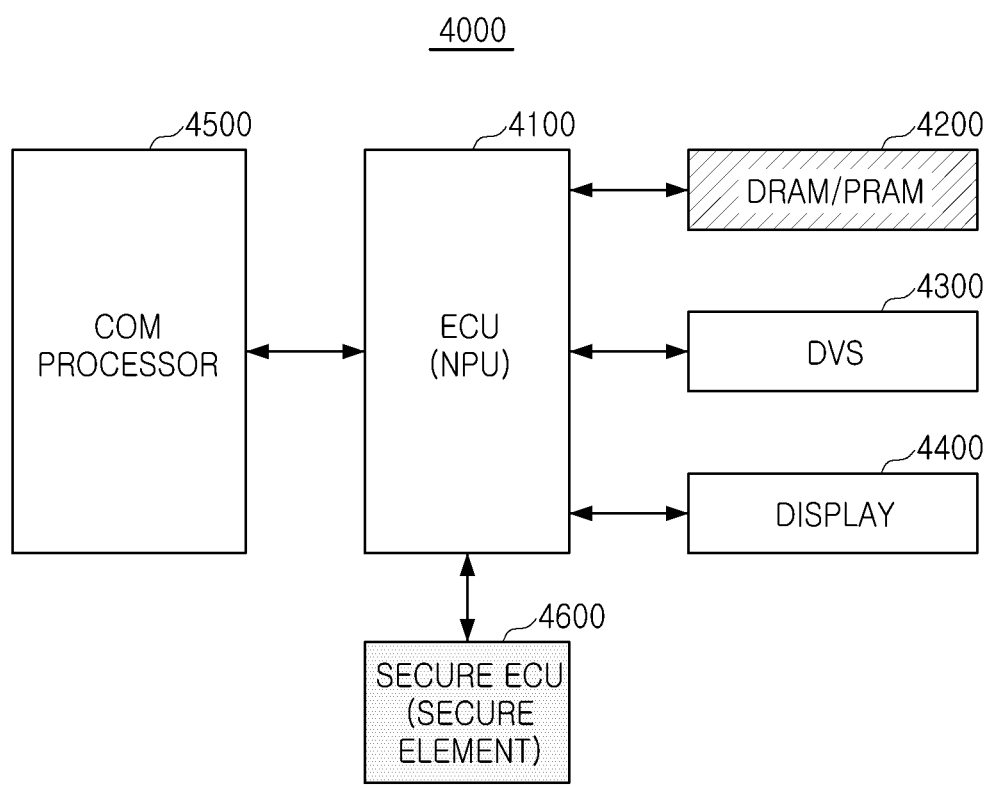
FIG. 13 is a block diagram illustrating an example an electric system according to an example embodiment of the present inventive concept.

FIG. 13 is a block diagram illustrating an electric system 4000 according to an example embodiment in the present inventive concept. Referring to FIG. 13, the vehicle electric system 4000 may include an electronic control unit (ECU) 4100, a memory device 4200, at least one dynamic range sensor (DVS) 4300, a display 4400, a communication processor 4500, a secure ECU 4600.

The ECU 4100 may be realized to control an overall operation. The ECU 4100 may process image data received from the DVS 4300. The ECU 4100 may include a neural processing unit (NPU). The NPU may quickly derive an optimal image for driving by comparing the image received from the DVS 4300 with a learning model.

The memory device 4200 may be realized to store the learning model related to an operation of the NPU. The memory device 4200 may include a volatile or non-volatile memory device. For example, the memory device 4200 may be a DRAM or a PRAM.

The DVS 4300 may be realized to detect an environment outside the vehicle. The DVS 4300 may output an event signal in response to a change in relative light intensity. The DVS 4300 may include a pixel array including a plurality of DVS pixels and address event processors.

The display device 4400 may be realized to display the image processed by the ECU 4100 or an image transmitted by the communication processor 4500.

The communication processor 4500 may be realized to transmit the processed image to an external device, e.g., an external vehicle, or to receive an image from the external vehicle. That is, the communication processor 4500 may be realized to communicate with the external device in a wired or wireless manner.

The secure ECU 4600 may be realized to control a general operation related to security of the electric system 4000. The secure ECU 4600 may include a configuration or function of the security chip performing the data destruction operation described above with reference to FIGS. 1 to 10. Meanwhile, when the secure ECU 4600 detects a hacking threat, the secure ECU 4600 may perform a data destruction operation on internal data.

According to an example embodiment, the present inventive concept may be applicable to a data server system.

Figure 14:
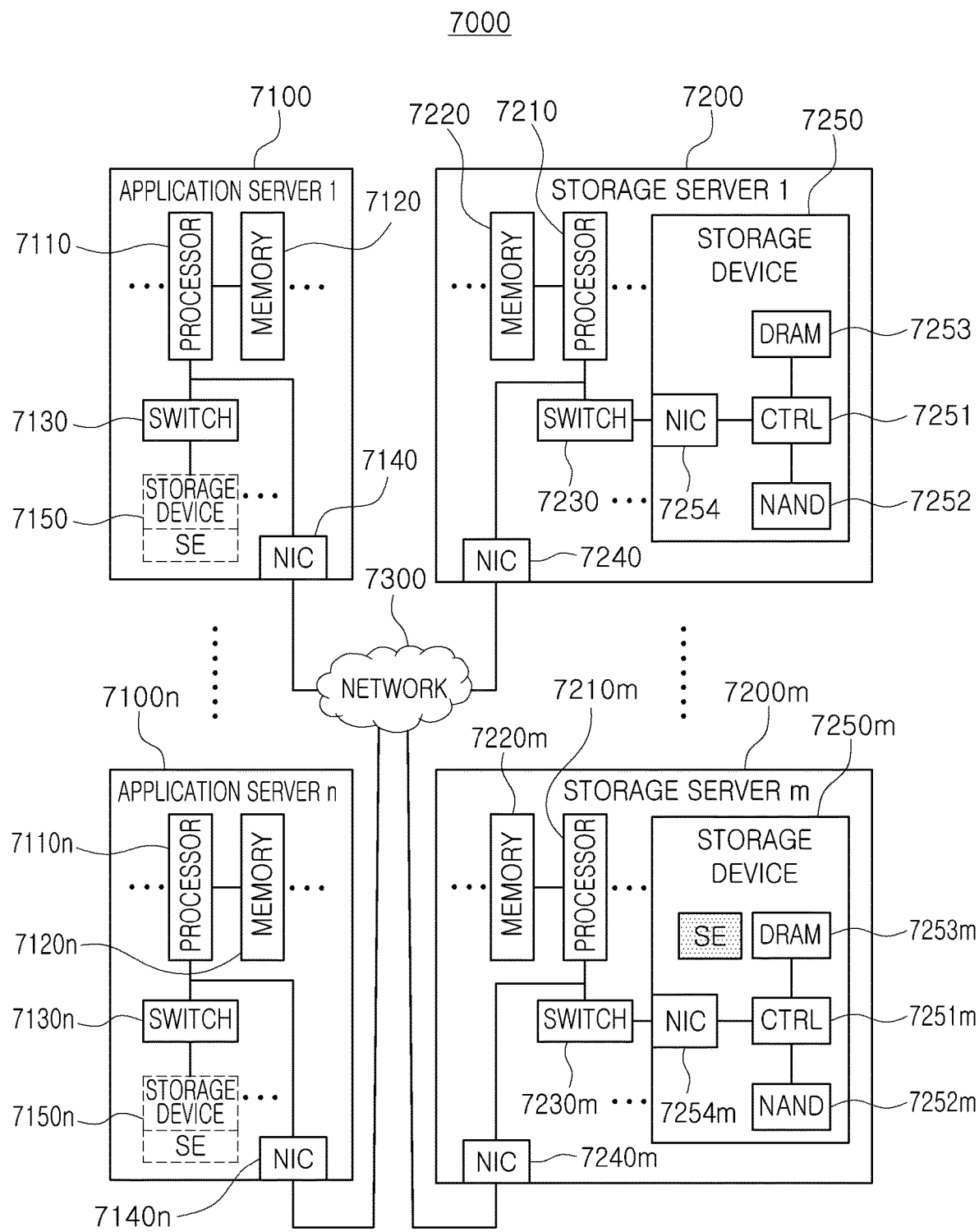
FIG. 14 is a view illustrating a data center to which a memory device is applied according to an example embodiment of the present inventive concept.

FIG. 14 is a view illustrating a data center to which a memory device according to an example embodiment in the present inventive concept is applied. Referring to FIG. 14, a data center 7000 is a facility that collects various data and provides services, which may also be referred to as a data storage center. The data center 7000 may be a system for operating a search engine and a database or may be a computing system used by companies such as banks or government agencies. The data center 7000 may include application servers 7100 to 7100n and storage servers 7200 to 7200m. The number of application servers 7100 to 7100n and the number of storage servers 7200 to 7200m may be variously selected according to example embodiments, and the number of application servers 7100 to 7100n and the number of storage servers 7200 to 7200m may be different from each other.

The application server 7100 or the storage server 7200 may include at least one of processors 7110 and 7210 and memories 7120 and 7220. Referring to the storage server 7200 as an example, the processor 7210 may control an overall operation of the storage server 7200 and access the memory 7220 to execute instructions and/or data loaded in the memory 7220. The memory 7220 may be a double data rate synchronous DRAM (DDR SDRAM), a high bandwidth memory (HBM), a hybrid memory cube (HMC), a dual in-line memory module (DIMM), an optane DIMM, or a non-volatile DIMM (NVMDIMM). According to an example embodiment, the number of processors 7210 and the number of memories 7220 included in the storage server 7200 may be variously selected. In an example embodiment, the processor 7210 and memory 7220 may provide a processor-memory pair. In an example embodiment, the number of the processor 7210 and the memory 7220 may be different from each other. The processor 7210 may include a single-core processor or a multi-core processor. The above description of the storage server 7200 may be similarly applied to the application server 7100. According to an example embodiment, the application server 7100 may not include a storage device 7150. The storage server 7200 may include at least one storage device 7250. The number of storage devices 7250 included in the storage server 7200 may be variously selected according to example embodiments.

The application servers 7100 to 7100n and the storage servers 7200 to 7200m may communicate with each other through a network 7300. The network 7300 may be realized using a fiber channel (FC) or Ethernet. Here, FC may be a medium used for relatively high-speed data transmission, and may be an optical switch that provides high performance/high availability. Depending on an access method of the network 7300, the storage servers 7200 to 7200m may be provided as a file storage, a block storage, or an object storage.

In an example embodiment, the network 7300 may be a storage-only network such as a storage area network (SAN). For example, the SAN may be an FC-SAN which uses an FC network and is realized according to an FC protocol (FCP). As another example, the SAN may be an IP-SAN which uses a TCP/IP network and is realized according to an iSCSI (SCSI over TCP/IP or Internet SCSI) protocol. In other example embodiments, the network 7300 may be a general network such as a TCP/IP network. For example, the network 7300 may be realized according to protocols such as FC over Ethernet (FCoE), network attached storage (NAS), NVMe over Fabrics (NVMe-oF), and the like.

Hereinafter, the application server 7100 and the storage server 7200 will be mainly described. The description of the application server 7100 may also be applied to other application servers 7100n, and the description of the storage server 7200 may also be applied to other storage servers 7200m.

The application server 7100 may store data, which is requested to be stored by the user or a client, in one of the storage servers 7200 to 7200m through the network 7300. In addition, the application server 7100 may acquire data, which is requested to be read by the user or the client, from one of the storage servers 7200 to 7200m through the network 7300. For example, the application server 7100 may be realized as a web server, a database management system (DBMS), or the like.

The application server 7100 may access a memory 7120n or a storage device 7150n included in another application server 7100n through the network 7300 or access the memories 7220 to 7220m or storage devices 7250 to 7250m included in the storage servers 7200 to 7200m through the network 7300. Accordingly, the application server 7100 may perform various operations on data stored on the application servers 7100 to 7100n and/or storage servers 7200 to 7200m. For example, the application server 7100 may execute a command to move or copy data between the application servers 7100 to 7100n and/or the storage servers 7200 to 7200m. In this case, the data may be moved directly from the storage devices 7250 to 7250m of the storage servers 7200 to 7200m to the memories 7120 to 7120n of the application servers 7100 to 7100n or via the memories 7220 to 7220m of the storage servers 7200 to 7200m. The data moved through the network 7300 may be encrypted data for security or privacy.

Referring to the storage server 7200 as an example, the interface 7254 may provide a physical connection between the processor 7210 and the controller 7251 and a physical connection between the NIC 7240 and the controller 7251. For example, the interface 7254 may be implemented by a direct attached storage (DAS) method that directly connects the storage device 7250 with a dedicated cable. In addition, referring to the storage server 7200 as an example, an interface (NIC) 7254 may provide a physical connection between the processor 7210 and a controller 7251 and a physical connection between an NIC 7240 and the controller 7251. For example, the interface 7254 may be realized by a direct attached storage (DAS) method that directly accesses the storage device 7250 by a dedicated cable. In addition, for example, the interface 7254 may be realized by various interface methods such as advanced technology attachment (ATA), serial ATA (SATA), external SATA (e-SATA), small computer small interface (SCSI), serial attached SCSI (SAS), peripheral component interconnection (PCI), PCI express (PCIe), NVM express (NVMe), IEEE 1394, universal serial bus (USB), secure digital (SD) card, multi-media card (MMC), embedded multi-media card (e-MMC), universal flash storage (UFS), embedded universal flash storage (eUFS), compact flash (CF) card interface.

The storage server 7200 may further include a switch 7230 and a NIC 7240. The switch 7230 may selectively connect the processor 7210 and the storage device 7250 under the control of the processor 7210 or selectively connect the NIC 7240 and the storage device 7250.

In an example embodiment, the NIC 7240 may include a network interface card, a network adapter, and the like. The NIC 7240 may be connected to the network 7300 by a wired interface, a wireless interface, a Bluetooth interface, an optical interface, or the like. The NIC 7240 may include an internal memory, a DSP, a host bus interface, and the like and may be connected to the processor 7210 and/or the switch 7230 through the host bus interface. The host bus interface may be realized as one of the examples of the interface 7254 described above. In an example embodiment, the NIC 7240 may be incorporated with at least one of the processor 7210, the switch 7230, and the storage device 7250.

In the storage servers 7200 to 7200m or the application servers 7100 to 7100n, the processor may transmit a command to the storage devices 7130 to 7130n and 7250 to 7250m or the memories 7120 to 7120n and 7220 to 7220m to program data or read data. In this case, the data may be data error-corrected through an error correction code (ECC) engine. The data may be data which has undergone data bus inversion (DBI) or data masking (DM) and may include cyclic redundancy code (CRC) information. The data may be data encrypted for security or privacy.

The storage devices 7150 to 7150n and 7250 to 7250m may transmit a control signal and a command/address signal to NAND flash memory devices 7252 to 7252m in response to a read command received from the processor. Accordingly, when data is read from the NAND flash memory devices 7252 to 7252m, a read enable (RE) signal may be input as a data output control signal to serve to output data to a DQ bus. A data strobe (DQS) may be generated using the RE signal. The command and address signal may be latched to a page buffer according to a rising edge or a falling edge of a write enable (WE) signal.

The controller 7251 may control an overall operation of the storage device 7250. In an example embodiment, the controller 7251 may include a static random access memory (SRAM). The controller 7251 may write data into the NAND flash 7252 in response to a write command or may read data from the NAND flash 7252 in response to a read command. For example, the write command and/or read command may be provided from the processor 7210 in the storage server 7200, the processor 7210m in another storage server 7200m, or the processors 7110 to 7110n in the application servers 7100 to 7100n. A DRAM 7253 may temporarily store (buffer) the data written into the NAND flash 7252 or data read from the NAND flash 7252. In addition, the DRAM 7253 may store metadata. Here, the metadata is user data or data generated by the controller 7251 to manage the NAND flash 7252. The storage device 7250 may include a secure element (SE) for security or privacy. Meanwhile, the SE shown in FIG. 14 exists outside the memory controller, but the present inventive concept is not limited thereto. The SE of the present inventive concept may be embedded in the memory controller. The SE of the present inventive concept may be used to prove the data disposal operation of the storage device as illustrated in FIGS. 1 to 10.

The storage device according to an example embodiment in the present inventive concept may include a structure that causes damage in an integrated circuit (IC) by a user's physical force by connecting each structure to the security chip.

In addition, the storage device according to an example embodiment in the present inventive concept may include a structure for attaching an identification module such as a barcode/QR/RFID to an extraction structure of the storage device and the security chip.

In addition, the storage device according to an example embodiment in the present inventive concept may include an antenna attachment structure for wireless power communication in the storage device. A secure element (SE) for the disposal of data of a data storage device such as an SSD or a hard disk drive (HDD) may be applied. In addition, the storage device according to an example embodiment of the present inventive concept may use a means for proof of disposal, such as a QR code or NFC, which is associated with a secure element in a data storage device such as an SSD or an HDD.

As set forth above, in a storage device and a disposal method thereof embodiment according to an example embodiment of the present inventive concept, a data disposal operation may be simply and inexpensively verified by providing a security chip having identification information.

While example embodiments have been shown and described above, it will be apparent to those skilled in the art that modifications and variations could be made without departing from the scope of the present inventive concept as defined by the appended claims.

What is claimed is:

1. A storage device comprising:
at least one non-volatile memory device;
a memory controller configured to:
encrypt data using key information and store the encrypted data in the at least one non-volatile memory device, or
read the encrypted data from the at least one non-volatile memory device, decrypt the read encrypted data using the key information as decrypted data and output the decrypted data to an external device; and
a security chip connected to the memory controller, and configured to store the key information,
wherein the security chip includes an identification module related to a data disposal operation,
wherein the identification module includes a device configured to perform an authentication operation using identification information of the storage device, and
wherein, during the data disposal operation, after the security chip is physically discarded, a part of the security chip verifies the data disposal operation using a function of the device configured to perform the authentication operation using the identification information of the storage device.

2. The storage device of claim 1, wherein the memory controller and the security chip periodically or non-periodically perform a first authentication operation, and
the security chip stores first authentication information corresponding to the first authentication operation.

3. The storage device of claim 1, wherein the identification module includes at least one of a barcode, a quick response (QR) code, a radio-frequency identification (RFID) chip, and a near field communication (NFC) chip.

4. The storage device of claim 1, wherein the identification module includes a barcode,
wherein, during the data disposal operation, an external device confirms disposal of the storage device by recognizing the barcode of the security chip separated from the storage device.

5. The storage device of claim 4, wherein the security chip comprises:
a first security core chip;
a package configured to house the first security core chip;
a flexible substrate on which the package is mounted;
a connector provided at one end of the flexible substrate, the connector configured to be electrically connected to the memory controller; and
the barcode provided at another end of the flexible substrate.

6. The storage device of claim 4, wherein the security chip comprises:
a first security core chip;
a package configured to house the first security core chip;
a flexible substrate on which the package is mounted; and
a connector provided at one end of the flexible substrate, the connector configured to be electrically connected to the memory controller,
wherein the flexible substrate is covered with the barcode.

7. The storage device of claim 1, wherein the device configured to perform the authentication operation using the identification information of the storage device includes a near field communication (NFC) chip, and
wherein, during the data disposal operation, an external device confirms the disposal of the storage device by performing wireless communication with the NFC chip.

8. The storage device of claim 7, wherein the security chip comprises:
a first security core chip;
a package configured to house the first security core chip; and
a flexible substrate on which the package is mounted,
a connector provided at one end of the flexible substrate, the connector configured to be electrically connected to the memory controller,
wherein the NFC chip is provided at another end of the flexible substrate.

9. The storage device of claim 8, wherein the NFC chip comprises
a second security core chip configured to communicate with the first security core chip; and
an NFC antenna configured to perform wireless communication with the external device.

10. The storage device of claim 9, wherein the first security core chip and the second security core chip periodically or non-periodically perform a second authentication operation,
wherein, during the data disposal operation, the external device and the NFC chip perform a third authentication operation.

11. A storage device, comprising:
at least one non-volatile memory device;
a memory controller configured to control the at least one non-volatile memory device; and
a security chip connected to the memory controller and configured to store key information corresponding to an encryption algorithm,
wherein the memory controller comprises:
at least one processor configured to control an overall operation of the memory controller;
a buffer memory configured to temporarily store data required for the overall operation of the memory controller;
an error correction circuit configured to generate a first error correction code of first data in a write operation, and correct at least one error of second data using a second error correction code in a read operation to produce error-corrected second data;
a crypto module configured to generate the first data by encrypting data using the encryption algorithm in the write operation, and to decrypt the error-corrected second data using the encryption algorithm in the read operation; and
a code memory configured to store code data for operating the memory controller;
a host interface circuit configured to provide an interface with an external device; and
a non-volatile memory interface circuit configured to provide an interface with the at least one non-volatile memory device, wherein, during the data disposal operation, the security chip is separated from the memory controller, and data disposal is confirmed through an authentication operation between the separated security chip and an external device, wherein the security chip comprises a device configured to perform an authentication operation using identification information of the storage device, and wherein, during the data disposal operation, after the security chip is physically discarded, a part of the security chip verifies the data disposal operation using a function of the device configured to perform the authentication operation using the identification information of the storage device.

12. The storage device of claim 11, wherein the memory controller and the security chip periodically or non-periodically perform a first authentication operation, and the security chip stores first authentication information corresponding to a result of the first authentication operation.

13. The storage device of claim 11, wherein the device configured to perform an authentication operation using identification information of the storage device comprises a near field communication (NFC) module, the security chip and the NFC chip periodically or non-periodically perform a second authentication operation, and the NFC chip stores second authentication information corresponding to a result of the second authentication operation.

14. The storage device of claim 13, wherein, during the data disposal operation, the external device performs wireless communications with the NFC chip to perform a third authentication operation.

15. A data disposal method of a storage device including: at least one non-volatile memory device, a security chip storing key information, and a memory controller configured to use the key information to store encrypted data in the at least one non-volatile memory device, or decrypt the encrypted data read from the at least one non-volatile memory device, the data disposal method comprising:

separating the security chip from the storage device; and performing an authentication operation between the separated security chip and an external verification device, wherein the security chip includes a device configured to perform an authentication operation using identification information of the storage device, and wherein, during a data disposal operation, after the security chip is physically discarded, a part of the security chip verifies the data disposal operation using a function of the device configured to perform the authentication operation using the identification information of the storage device.

16. The data disposal method of claim 15, further comprising performing a first authentication operation between the memory controller and the security chip; and storing first authentication information corresponding to the first authentication operation in the security chip, wherein the first authentication information comprises identification information corresponding to the storage device.

17. The data disposal method of claim 15, wherein the performing the authentication operation comprises recognizing a barcode connected to the security chip with the external verification device; and comparing the barcode stored with the external verification device with the recognized barcode.

18. The data disposal method of claim 15, further comprising performing a second authentication operation between the security chip and the device configured to perform the authentication operation using the identification information of the storage device, wherein the device configured to perform the authentication operation using the identification information of the storage device is connected to the security chip; and storing second authentication information corresponding to the second authentication operation in the NFC chip.

19. The data disposal method of claim 18, further comprising performing the authentication operation; and performing a third authentication operation with the device configured to perform the authentication operation using the identification information of the storage device with the external verification device.

20. The data disposal method of claim 18, further comprising receiving an authentication request for a data disposal operation from the external verification device in the device configured to perform the authentication operation using the identification information of the storage device.

* * * * *